United States Patent [19]

Melville et al.

[11] Patent Number: 4,762,054
[45] Date of Patent: Aug. 9, 1988

[54] EXHAUST EXTRACTION RAIL ASSEMBLY

[75] Inventors: Phillip L. Melville, Alexandria, Va.; Rene M. Wallyn, Nogent-sur-France, France

[73] Assignee: Sacatec, Inc., Vienna, Va.

[21] Appl. No.: 70,723

[22] Filed: Jul. 7, 1987

[51] Int. Cl.⁴ ............................................. B08B 15/00
[52] U.S. Cl. .................................................. 98/115.4
[58] Field of Search ............... 98/115.4; 403/205, 295; 104/52; 248/58, 60, 324

[56] References Cited

U.S. PATENT DOCUMENTS

| | | | |
|---|---|---|---|
| 1,398,294 | 11/1921 | Carlson | 248/60 |
| 3,915,420 | 10/1975 | Norris | 248/58 |
| 4,233,889 | 11/1980 | Nederman | 98/115.4 |
| 4,385,850 | 5/1983 | Bobath | 403/205 |
| 4,660,465 | 4/1987 | Jentzsch et al. | 98/115.4 |

FOREIGN PATENT DOCUMENTS 2246043  3/1974  Fed. Rep. of Germany ..... 98/115.4

Primary Examiner—Harold Joyce
Attorney, Agent, or Firm—Witherspoon & Hargest

[57] ABSTRACT

An exhaust extraction rail assembly including a top rail with side rails connected thereto and extending downwardly therefrom with a pair of resilient sealing members extending inwardly from the bottom edges of the side rails to close off the space therebetween and thus form a central line of contact between the sealing members, an exhaust spout sealingly positioned in the central line of contact of the sealing member for longitudinal movement therealong, a carriage assembly supporting the exhaust spout and carrying wheels riding in a track channel on the bottom edge portion of each side rail member.

12 Claims, 3 Drawing Sheets

EXHAUST EXTRACTION RAIL ASSEMBLY

This invention relates to the collection and discharge of exhaust gases, especially those from motor vehicles and more particularly to the exhaust extraction rail assembly which delivers the exhaust gas from the motor vehicle to the discharge point.

BACKGROUND AND OBJECTS

The need for properly controlling and discharging exhaust gases from motor vehicles is not a new problem. A more or less obvious solution to this problem is to attach a flexible tube to the vehicle exhaust and discharge it at some convenient point where no harm will be done by the release of such gases. An immediate problem arises with regard to the running of flexible tubes all over a busy shop area. Such has resulted in numerous patent solutions. For example the patent to Imming, U.S. Pat. No. 3,473,462, relates to the exhausting of monoxide gas wherein a flexible exhaust tube is telescoped when not in use in a storage duct suspended in an area from interference with workmen repairing or otherwise testing internal combustion engines while they are in operation. The exhaust pipe is easily withdrawn from stored position ready for attachment to an exhaust pipe of an engine.

An arrangement may be made wherein an overhead conduit has a plurality of hose members fluidly connected thereto so that the hoses may be connected to the exhaust pipes of a plurality of motor vehicles. A blower may be provided to enchance discharge through the conduit. Such an arrangement is disclosed in Ambli U.S. Pat. No. 3,200,765.

Many refinements have been made to the overhead conduit adapted to receive and discharge exhaust gases. In this connection, the U.S. Pat. No. to Nederman 4,233,889 is particularly interesting. The track illustrated in the drawings is an overhead track and adapted to allow gas to be conducted away from or supplied to some space along the track. Thus, for instance, exhaust gases from a motor vehicle can be carried away by moving a hose-carrying unit along the track until its hose can be connected to the exhaust pipe of the vehicle whereby the exhaust gases can be conducted into at least one through-flow passage within the track and through the latter into one (or more) gas conduits, which, through a duct can be connected to a gas suction device, for instance a blower.

The complicated nature of the Nederman apparatus makes it immediately apparent that there is need for improvement in the exhaust extraction rail art.

In view of the foregoing it is an object of this invention to provide an exhaust extraction rail assembly which may be made in modular form with the main rail components being made by extrusion.

It is yet another object of this invention to provide an exhaust extraction rail assembly which is easily assembled.

It is a still further object to provide an exhaust rail assembly wherein a minimum number of parts are exposed to the effects of the exhaust gases.

It is another object of this invention to provide an exhaust extraction rail assembly with mounting means to produce a universal mounting ability.

The foregoing and additional objects and advantages will become more apparent in view of the following drawings and detailed description directed to a preferred embodiment of this invention.

IN THE DRAWINGS

FIG. 1 is a pictorial view showing the environment in which this invention is employed, wherein the vehicle exhaust pipe is connected to a flexible hose feeding the engine exhaust to the extraction rail assembly, FIG. 2 is a perspective view of the exhaust extraction rail assembly with the end closure plate set back to illustrate structural details, FIG. 3 is a basic vertical sectional view of the extraction rail assembly and, FIG. 4 is a perspective view of the exhaust extraction rail assembly with the mounting means affixed to the top thereof.

DETAILED DESCRIPTION

Figure 1:
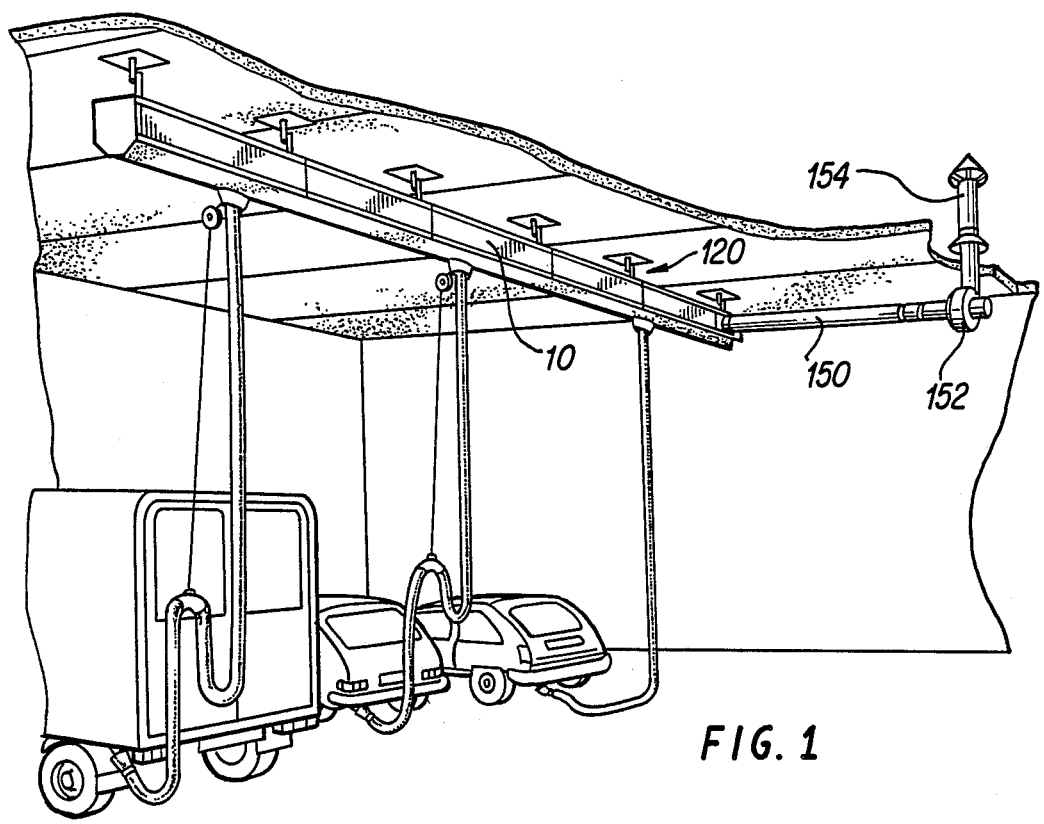

The exhaust extraction rail assembly 10 is made mostly of aluminum and comprises three longitudinally extending extruded portions namely a top rail portion 12 with side rail portions 14 and 16 connected to and extending downwardly from said top rail portion 12. The top rail 12 and side rail portions 14 and 16 are made up of a plurality of extruded sections which are conveniently assembled as will be explained later.

The upper portions of side rail portions 14 and 16 are each provided with retaining means 18 and 20 respectively which cooperate with connecting means 22 and 24 extending downwardly from the sides of the top rail portion 12. More specifically, retaining means 18 cooperates with connecting means 22 and retaining means 20 cooperates with connecting means 24 to retain the three components in assembled position. Interior bracing may also be used to rigidly retain position. In this connection see FIG. 2 and cross brace 19 extending between side rails 14 and 16.

The bottom portion of the side rail portion 14 is formed into three integral and independently functioning elements. A flanged channel member 26 extends along the longitudinal outside bottom edge of the side rail portion 14 with an open face 28 directed outwardly from the side rail portion 14. At the bottom edge 30 of the side rail portion 14 a flange 32 extends inwardly therefrom and has a horizontal portion 34 and then an angular portion 36 extending downwardly at about 30 degrees from the horizontal portion. At the inward end of the horizontal portion 34 a flange 38 extends upwardly and terminates in an offset shoulder 40.

A track member 42 extends downwardly from the bottom portion of flanged channel member 26 and longitudinally along the length of the side rail portion 14. The track member 42 includes a track side 44 extending downwardly from the channel member 26 with a track bearing portion 46 extending horizontally inward from the lower end of the track side 44 with the inward end of track bearing portion 46 terminating in a vertically disposed keeper flange 48.

Side rail portion 16 is provided with an arrangement like that described for side rail portion 14. Specifically, the bottom portion of the side rail portion 16 is formed into three integral and independently functioning elements. A flanged channel member 52 extends along the longitudinal outside bottom edge of the side rail portion 16 with an open face 54 directed outwardly from the side rail portion 16. At the bottom edge 56 of the side rail portion 16 a flange 58 extends inwardly therefrom and has a horizontal portion 60 followed by an angular portion 62 extending downwardly at about 30 degrees from the horizontal. At the inward end of the horizontal portion 58 a flange 64 projects upwardly and terminates in an offset shoulder 66.

A track member 68 extends downwardly from the bottom portion of flanged channel member 52 and longitudinally along the length of the side rail portion 16. The track member 68 includes a track side 70 extending downwardly from the channel member 52 with a track bearing portion 72 extending horizontally inward from the lower end of the track side 70 with the inward end of track bearing portion 72 terminating in a vertically disposed keeper flange 74.

Figure 2:
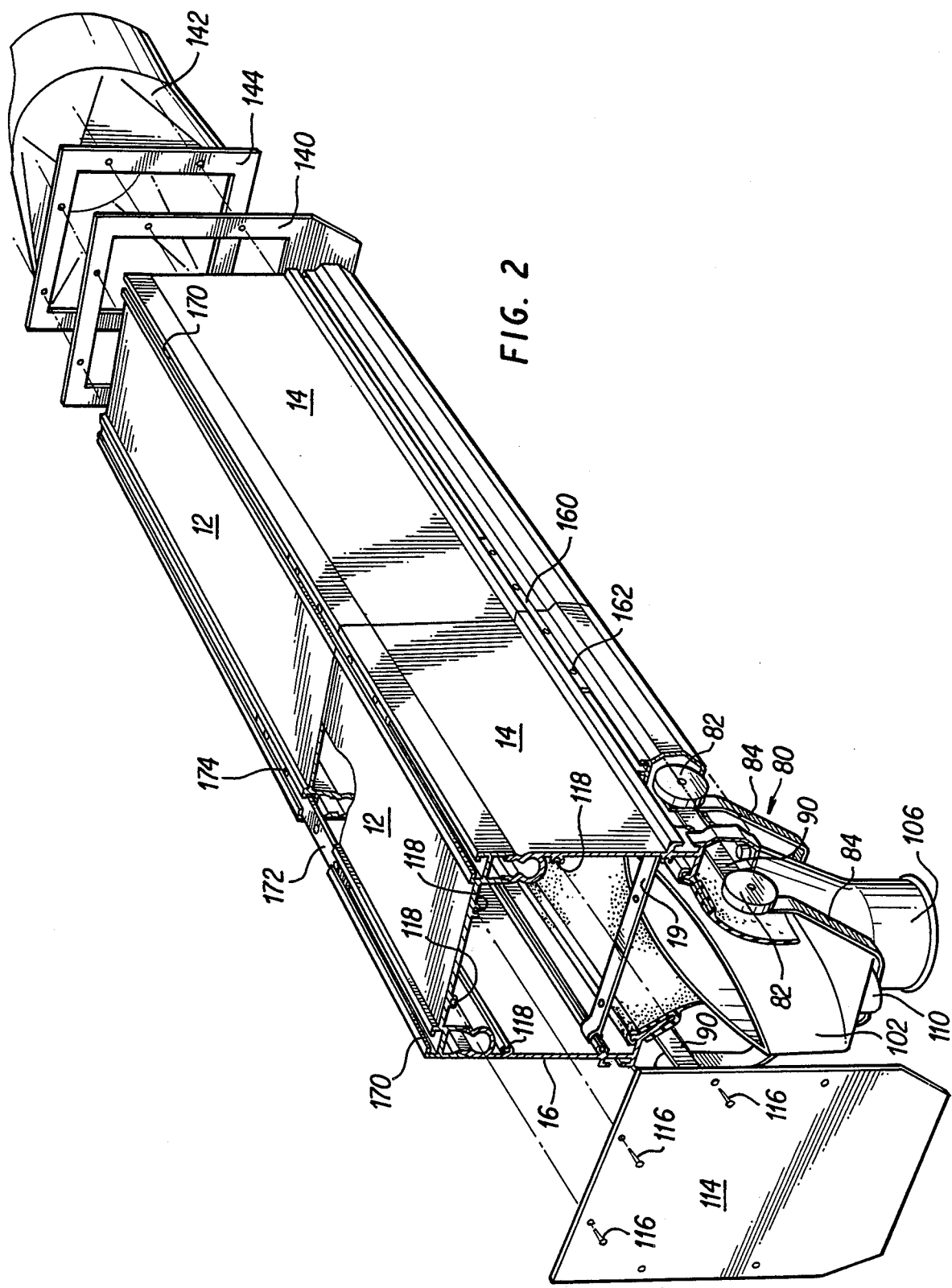
Figure 3:
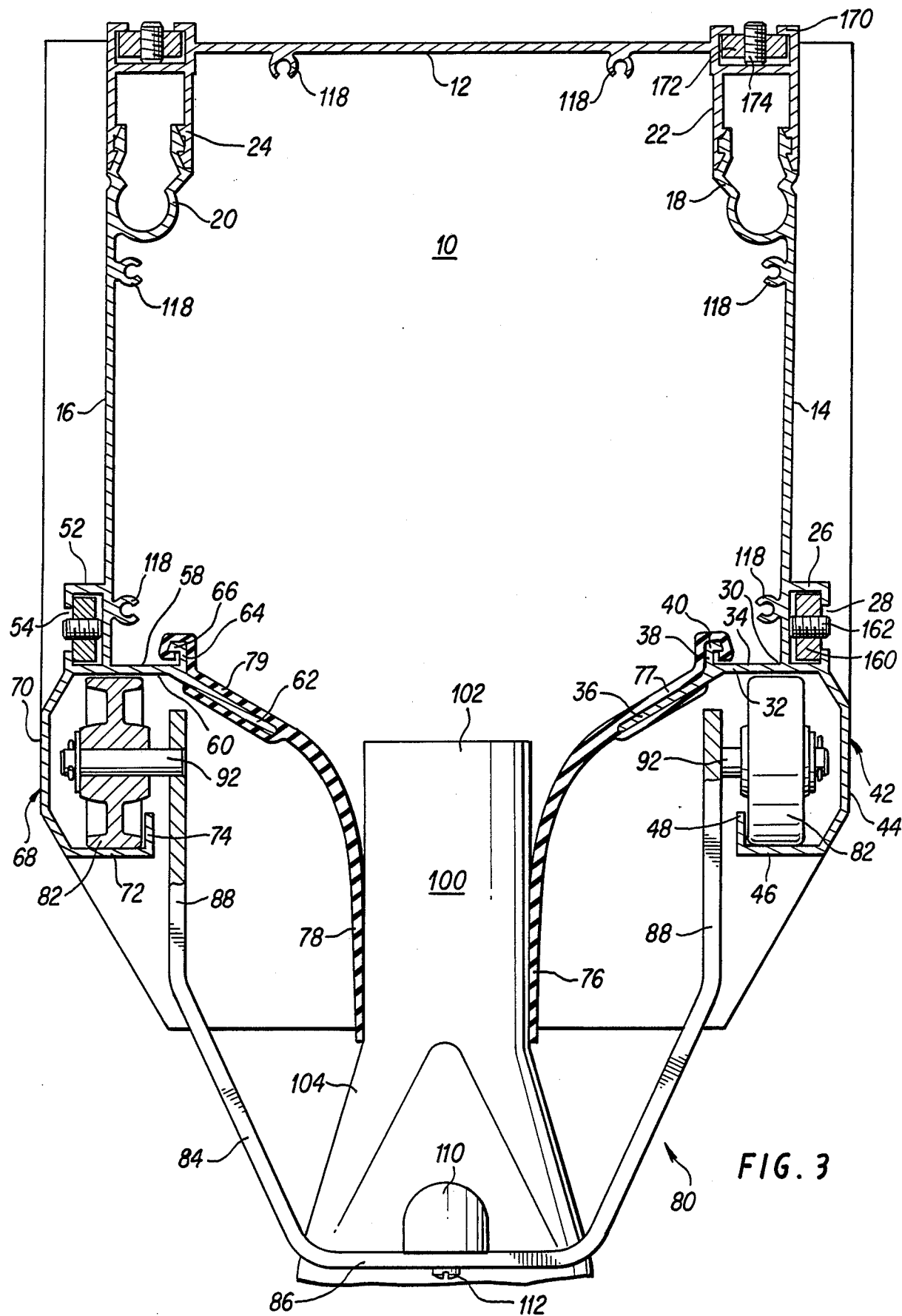

As best shown in FIGS. 2 and 3 the space between confronting flanges 36 and 62 is closed off by means of resilient sealing lips 76 and 78. The upper end 77 of lip 76 is configured so as to fit over flange 36 and up, over and around flange 38 and shoulder 40. It is by this arrangement that the lip 76 is retained in operative position. Similarly, the upper end 79 or lip 78 is configured so as to fit over flange 62 and up, over and around flange 64 and shoulder 66 to thereby retain lip 78 in operative position. The lower end portions of lips 76 and 78 may be somewhat reduced in thickness so as to provide greater sealability.

A wheel carriage assembly 80 rotatably carries four support wheels 82, two of such wheels riding in tracks 42 and 68, respectively. As illustrated in FIGS. 2 and 3, the wheel carriage assembly 80 comprises a pair of generally U-shaped supports 84—84 each having a generally flat closed end portion 86 with upwardly extending legs 88—88. These two U-shaped supports are held in spaced relation at their upper ends by means of connecting horizontal braces 90—90. Wheels 82 are connected to the carriage assembly 80 at the point where a support leg 88 meets the brace 90 by means of a shaft 92 suitably affixed to the carriage assembly 80.

The carriage assembly 80 supports the exhaust spout 100 for longitudinal traverse. The exhaust spout 100 is shaped to adapt it for its intended purpose. More particularly, the upper portion 102 of the exhaust spout 100 in cross section is somewhat elliptical with the ends generally pointed as best shown in FIG. 2. The height of the upper portion 102 is more than sufficient to provide good sealing contact with the sealing lips 76 and 78. A transition portion 104 extends downwardly from the upper 102 and terminates in a downwardly extending bottom cylindrical portion 106. A shoulder bearing 110 projects from each end of the transition portion 104 and rigidly supports the flat portion 86 of each support 84 to which it is connected by means of screw 112. Thus the carriage assembly 80 supports the exhaust spout 100 and by means of wheels 82 attached to the carriage assembly the exhaust spout 100 is traversed along the rail assembly between sealing lips 76 and 78.

As shown in FIG. 2 the open end is closed by means of closure plate 114 affixed to the top and side rails by means of screws 116 threadably received in extruded elements 118 found on the inner faces of the respective rail members.

Figure 4:
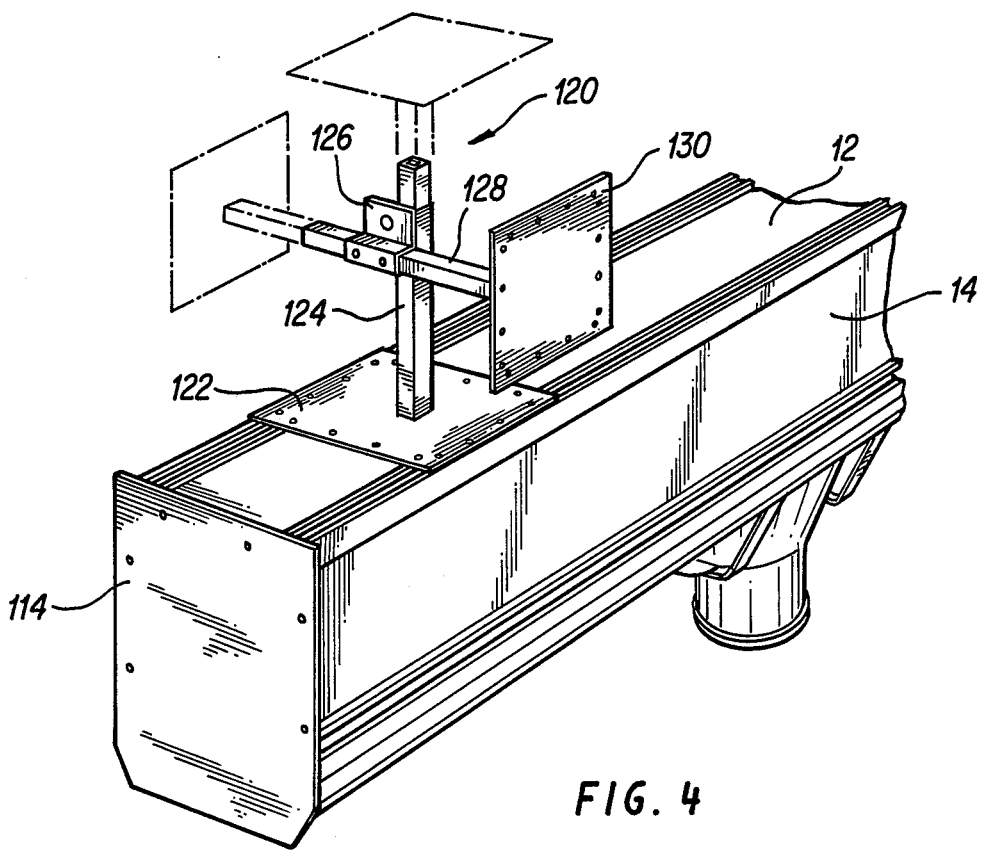

Referring to FIGS. 1 and 4 the extraction rail assembly 10 is mounted and held in position by means of a plurality of support assemblies. Each support assembly 120 comprises a base plate 122 secured to the top rail 12 and centrally mounting an upwardly projecting column 124. A bracket 126 is pivotally connected to the column 124 and rotatably mounts bar 128 to which upper plate 130 is secured. For attachment to a ceiling as illustrated in FIG. 1, base plate 122 is fastened to the top rail 12 and the bar 128 is rotated so that upper plate 130 is directly opposed to base plate 122. The upper plate 130 is then attached to the overhead as illustrated in FIG. 1.

As best shown in FIGS. 1 and 2, the discharge end of the extraction rail assembly 10 includes an intermediate plate 140 connected to the open end of the extraction rail and a transition member 142 having a plate member 144 sized to cooperate with intermediate plate 140. Both the intermediate plate 140 and the plate member 144 have cooperating openings to allow passage of gases therethrough. As shown in FIG. 1, the discharge is taken from the rail side by way of transition member connected to pipe 150 fluidly connected to a blower 152 for directing gases outwardly through discharge pipe 154. It should be noted that the discharge may be taken from the top or either side depending upon the layout requirements.

Referring to FIGS. 2 and 3, the sections of the side rail 14 are held in assembled position by means of assembly bar 160 slidably carried in channel 26. The assembly bar 160 is held in position by means of screws 162 engaging the bottom 27 of the channel 26. The top rail 12 is similarly assembled. Specifically, the top rail 12 is provided with longitudinally extending channels 170, one adjacent each side. Assembly bars 172 slidably ride in said channels and are returned therein by means of screws 174 engaging the bottom 176 of the channel 170.

The choice of material and method of making and assembling the components may be varied since what has been disclosed is a preferred embodiment of the invention.

What is claimed is:

1. In an exhaust discharge system for one or more exhaust producing sources, said system including a flexible conduit adapted to be connected to each exhaust producing source, said conduits being fluidly connected to an exhaust extraction rail assembly which in turn feeds exhaust to a blower which discharges the exhaust to the atmosphere or other appropriate exhaust receiving means, said exhaust extraction rail assembly comprising:
   1. an extraction rail, said rail having a top rail member with parallel longitudinal side edges and a side rail member connected to and extending downwardly from each side edge, each side rail member having an upper longitudinal edge and a bottom longitudinal edge,
   2. interengaging connecting means on both side edges of the top rail member and the upper longitudinal edge of each side rail member for connecting the top rail member with its respective side rail member,
   3. resilient sealing means closing off the opening formed between the bottom side edges of the two side rail members, said sealing means being longitudinally and centrally divided with respect to the side rail members,
   4. the bottom longitudinal edge portion of each side rail member having three integral and independently functioning components;
      (a) a longitudinal channel extending along the bottom longitudinal edge portion of each side rail member, said channel having an outwardly directed opening,
      (b) wheel track means extending downwardly from the bottom longitudinal edge portion of each side rail member and generally coextensive therewith, (c) flange means extending inwardly from the bottom longitudinal edge portion of each side rail member for supporting the sealing means, 5. an exhaust spout sealingly positioned in the longitudinal division in the sealing means, 6. carriage means connected to and supporting the exhaust spout in the sealing means for longitudinal movement with respect to said sealing means, said carriage means having wheels riding in the wheel track means extending downwardly from the bottom longitudinal edge portion of each side rail member, 7. assembly bar means slidably carried in the longitudinal channel extending along the bottom longitudinal edge portion of each side rail member to retain the side rail members adjacent thereto in assembled position, and means associated with each assembly bar for retaining same in locked position.

2. The invention as set forth in claim 1 and wherein the exhaust spout comprises a cylindrical bottom portion adapted to receive the flexible exhaust carrying conduit and a top portion somewhat elliptical in cross section said top portion being in sealing relation to the sealing means and discharging exhaust into the extraction rail.

3. The invention as set forth in claim 1 and wherein the sealing means comprises a pair of longitudinal extending resilient seals with the confronting inwardly extending edge portions contacting each other to form a seal while the outer portion of said pair are affixed to the flange means.

4. The invention as set forth in claim 3 and wherein each top rail is provided with longitudinal channels, one adjacent each longitudinal edge, said channels each having an opening upwardly of the top rail, assembly bars slidably carried in said channels to secure the separate lengths of top rail together and means for securing said bars in the channels.

5. The invention as set forth in claim 4 and wherein the carriage means comprises a pair of U-shaped supports, each having a generally flat closed end portion with upwardly extending legs, said pair of U-shaped supports held in spaced relation at their upper ends by horizontal braces connected thereto, a wheel being rotatably mounted at the four points wherein the braces and supports meet, the flat portion of each support being fixedly connected to the exhaust spout below the position where the sealing means engages said exhaust spout.

6. The invention as set forth in claim 5 and wherein means for mounting the exhaust extraction rail assembly is affixed to the top rail member.

7. The invention as set forth in claim 6 and wherein the means for mounting the exhaust extraction rail assembly has one or more support assemblies, each support assembly includes a base plate attached to the top rail member, an upwardly projecting column centrally extending from said base plate, a bracket pivotally secured to the column, a bar supported by said bracket for pivoting about the column and an upper plate secured to said bar and adapted for securing to the overhead to thereby mount the extraction rail assembly.

8. An exhaust extraction rail assembly for transferring exhaust gases from an exhaust producing source to a suitable discharge point, said exhaust extraction rail assembly comprising:

1. an extraction rail, said rail having a top rail member with parallel longitudinal side edges and a side rail member connected to and extending downwardly from each side edge, each side rail member having an upper longitudinal edge and a bottom longitudinal edge, 2. interengaging connecting means on both side edges of the top rail member and the upper longitudinal edge of each side rail member for connecting the top rail member with its respective side rail member, 3. resilient sealing means closing off the opening formed between the bottom side edges of the two side rail members, said sealing means being longitudinally and centrally divided with respect to the side rail members, 4. the bottom longitudinal edge portion of each side rail member having three integral and independently functioning components;

(a) a longitudinal channel extending along the bottom longitudinal edge portion of each side rail member, said channel having an outwardly directed opening, (b) wheel track means extending downwardly from the bottom longitudinal edge portion of each side rail member and generally coextensive therewith, (c) flange means extending inwardly from the bottom longitudinal edge portion of each side rail member for supporting the sealing means, 6. carriage means connected to and supporting the exhaust spout in the sealing means for longitudinal movement with respect to said sealing means, said carriage means having wheels riding in the wheel track means extending downwardly from the bottom longitudinal edge portion of each side rail member, 7. assembly bar means slidably carried in the longitudinal channel extending along the bottom longitudinal edge portion of each side rail member to retain the side rail members adjacent thereto in assembled position, and means associated with each assembly bar for retaining same in locked position.

9. The invention as set forth in claim 8 and wherein the exhaust spout comprises a cylindrical bottom portion adapted to receive the flexible exhaust carrying conduit and a top portion somewhat elliptical in cross section said top portion being in sealing relation to the sealing means and discharging exhaust into the extraction rail.

10. The invention as set forth in claim 9 and wherein the carriage means comprises a pair of U-shaped supports, each having a generally flat closed end portion with upwardly extending legs, said pair of U-shaped supports held in spaced relation at their upper ends by horizontal braces connected thereto, a wheel being rotatably mounted at the four points wherein the braces and supports meet, the flat portion of each support being fixedly connected to the exhaust spout below the position where the sealing means engages said exhaust spout.

11. The invention as set forth in claim 10 and wherein means for mounting the exhaust extraction rail assembly is affixed to the top rail member.

12. The invention as set forth in claim 11 and wherein the means for mounting the exhaust extraction rail assembly has one or more support assemblies, each support assembly includes a base plate attached to the top rail member, an upwardly projecting column centrally extending from said base plate, a bracket pivotally secured to the column, a bar supported by said bracket for pivoting about the column and an upper plate secured to said bar and adapted for securing to the overhead to thereby mount the extraction rail assembly.

* * * * *